United States Patent
Ueda

(10) Patent No.: US 10,567,594 B2
(45) Date of Patent: Feb. 18, 2020

(54) IMAGE FORMING APPARATUS, IMAGE FORMING SYSTEM, AND NON-TRANSITORY COMPUTER-READABLE RECORDING MEDIUM STORING A PROGRAM

(71) Applicant: Konica Minolta, Inc., Chiyoda-ku, Tokyo (JP)

(72) Inventor: Akio Ueda, Tokyo (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 15/730,222

(22) Filed: Oct. 11, 2017

(65) Prior Publication Data

US 2018/0124257 A1 May 3, 2018

(30) Foreign Application Priority Data

Nov. 1, 2016 (JP) .................. 2016-213994

(51) Int. Cl.
*H04N 1/04* (2006.01)
*H04N 1/00* (2006.01)

(52) U.S. Cl.
CPC ..... *H04N 1/00005* (2013.01); *H04N 1/00047* (2013.01); *H04N 1/0049* (2013.01); *H04N 1/00076* (2013.01); *H04N 1/00079* (2013.01)

(58) Field of Classification Search
CPC ........... H04N 1/00005; H04N 1/00047; H04N 1/00076; H04N 1/00079; H04N 1/0049

(Continued)

(56) References Cited

U.S. PATENT DOCUMENTS 6,328,303 B1 * 12/2001 Maetani ................ B65H 15/00
271/186
2005/0206954 A1    9/2005 Schwier et al.
(Continued)

FOREIGN PATENT DOCUMENTS

JP        2010-002463      1/2010
JP      2010070343 A      4/2010
(Continued)

OTHER PUBLICATIONS

Office Action (Notification of Reasons for Refusal) dated Dec. 13, 2019, by the Japanese Patent Office in corresponding Japanese Patent Application No. 2016-213994, and an English Translation of the Office Action. (27 pages).

(Continued)

*Primary Examiner* — Cheukfan Lee
(74) *Attorney, Agent, or Firm* — Buchanan Ingersoll & Rooney PC

(57) ABSTRACT

An image forming apparatus includes an image forming section for forming an image on a transfer medium, a conveyance section for conveying the transfer medium, and a control section for controlling image formation and conveyance. The control section is capable of acquiring an image reading result for a transfer medium on which an image is formed and determining whether the transfer medium is faulty, and, if the transfer medium is determined to be faulty and there are a plurality of output destinations for faulty transfer media which are the transfer medium determined to be faulty and transfer media having already been fed after the transfer medium determined to be faulty, gives a warning about removal of the faulty transfer media for each output destination.

45 Claims, 13 Drawing Sheets

(58) Field of Classification Search
USPC .......................................................... 358/3.26
See application file for complete search history.

(56) References Cited

U.S. PATENT DOCUMENTS

| | | | | |
|---|---|---|---|---|
| 2009/0009790 A1* | 1/2009 | Hosokawa | ............... | G06K 5/00 |
| | | | | 358/1.14 |
| 2017/0008724 A1* | 1/2017 | Satsukawa | ............. | B65H 31/24 |
| 2017/0308024 A1* | 10/2017 | Zhu | ........................ | G03G 15/70 |
| 2018/0107145 A1* | 4/2018 | Shibata | ................ | G03G 15/065 |

FOREIGN PATENT DOCUMENTS

| | | |
|---|---|---|
| JP | 2014-127738 | 7/2014 |
| JP | 2014144627 A | 8/2014 |
| JP | 2014-198465 A | 10/2014 |
| JP | 2015-172631 | 10/2015 |
| JP | 2015-179122 A | 10/2015 |

OTHER PUBLICATIONS

Office Action issued in corresponding Japanese Patent Application No. 2016-213994, dated Sep. 17, 2019, with English Translation (24 pages).

* cited by examiner

FIG.8
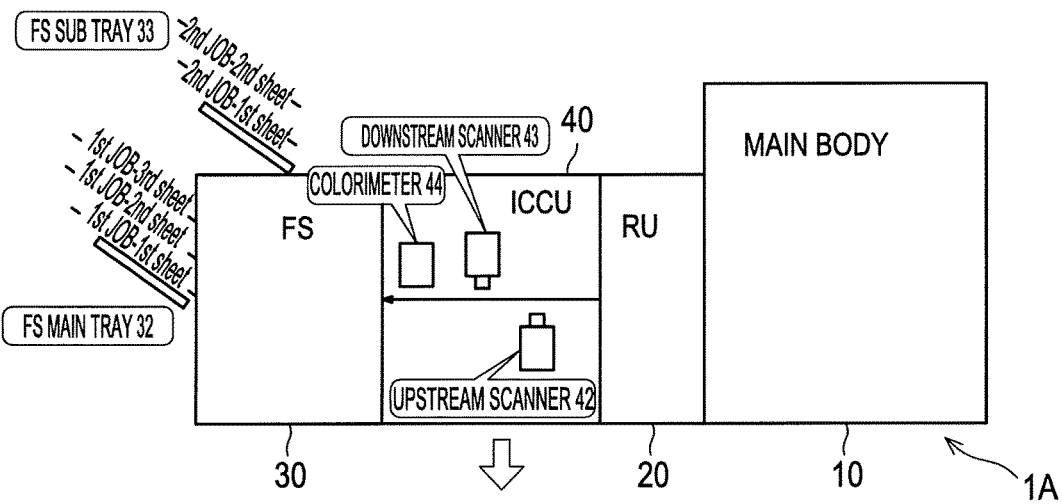
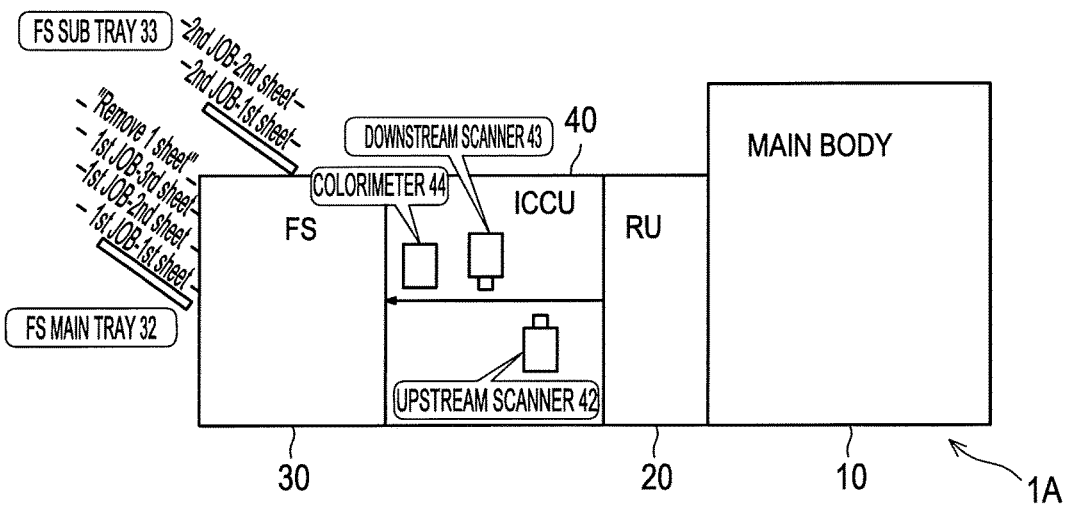

FIG.9
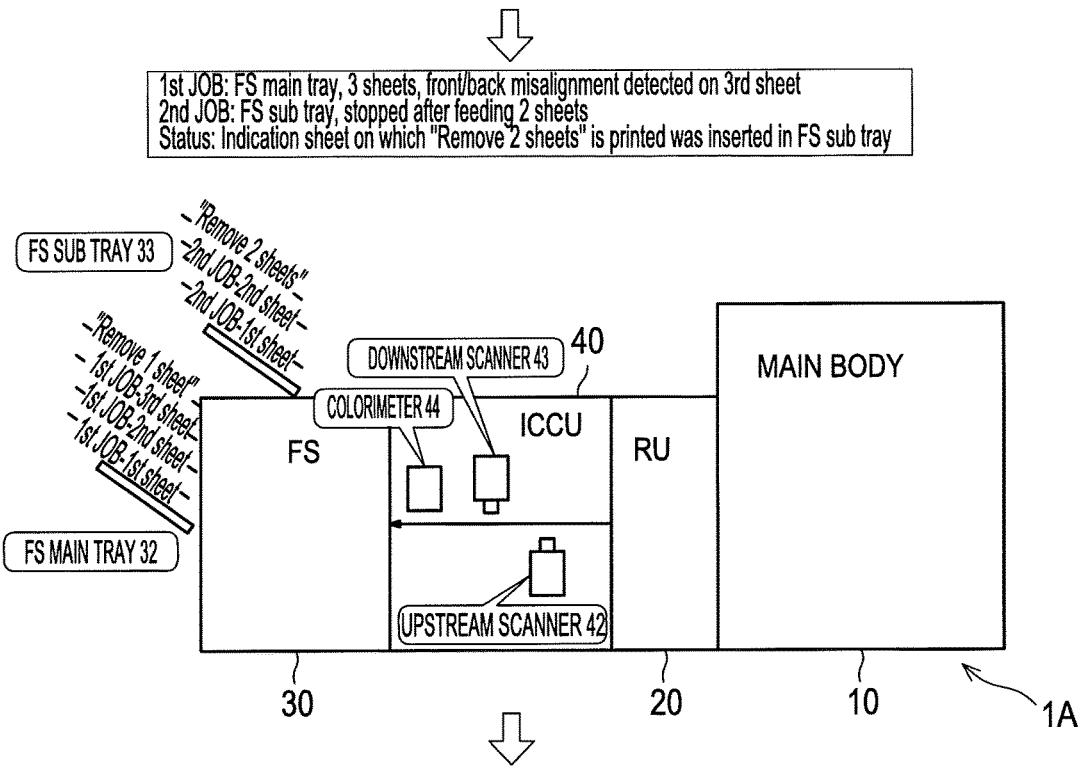
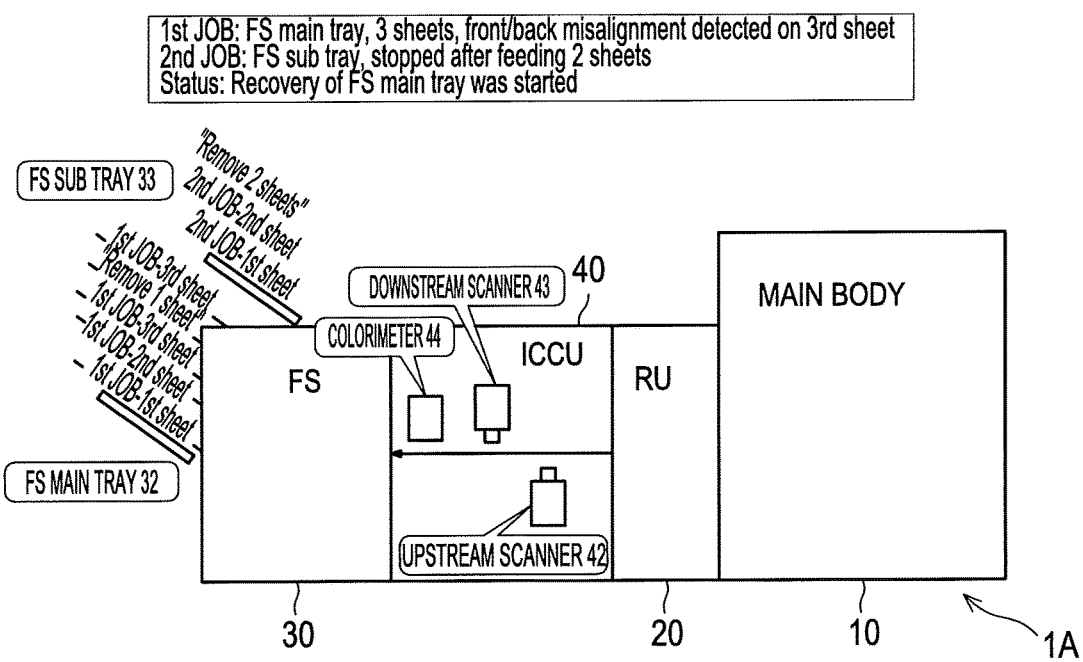

IMAGE FORMING APPARATUS, IMAGE FORMING SYSTEM, AND NON-TRANSITORY COMPUTER-READABLE RECORDING MEDIUM STORING A PROGRAM

Japanese patent application No. 2016-213994 filed on Nov. 1, 2016 including description, claims, drawings, and abstract the entire disclosure is incorporated herein by reference in its entirety

BACKGROUND

Technological Field

The present invention relates to an image forming apparatus, an image forming system, and a non-transitory computer-readable recording medium storing a program, which are capable of determining fault upon receipt of a reading result for an image formed on a transfer medium.

Description of the Related Art

In image forming apparatuses such as copying machines, facsimile machines, printers, and multifunction machines that form an image in an image forming section on the basis of image data, an image is output to paper based on image data included in a job, according to the set image forming conditions (image forming position, color, density, etc.). In the image forming section, since characteristics change temporarily or gradually as the image forming apparatus is operated, various adjustment operations are performed to maintain quality. Specifically, a patch image, a mark image, or the like is formed at predetermined time intervals at which the image forming apparatus is operated or for every predetermined number of printed sheets, and the patch of the image is detected by a color density sensor or the like in order to determine whether the image is formed properly, whether the position of the image is correct, and so on. Further, there is a device that reads a printed image, and determines whether the image is properly printed by comparing the printed image with image data used for image formation. As a result of the determination, if there is image position displacement or a problem in image quality, this device allows the paper having a printing fault to be removed as spoiled sheet from the outputs by outputting this paper to another output slot different from a normal output slot.

For example, Japanese Patent Laid-Open No. 2015-179122 relates to an apparatus which ejects sheets that have been normally output, sheets on which defect has been detected, and sheets that have been printed for recovery to different ejection destinations, respectively. For example, this apparatus is capable of switching three trays for each sheet and ejecting sheets as described below so that sheets on which defect has been detected and sheets that have been normally output are not mixed.

Ejection tray 1: sheets that have been normally output
Ejection tray 2: sheets on which defect has been detected
Ejection tray 3: sheets that have been printed for recovery Japanese Patent Laid-Open No. 2014-198465 discloses, on the premise that normally output sheets and sheets on which defect has been detected are ejected to a single destination, a technique of calculating a mounted position of a sheet on which defect has been detected and displaying the mounted position.

However, the invention of the present application also assumes a case where sheets determined to be faulty are output to a plurality of paper output destinations. In such a case, with the techniques disclosed in Japanese Patent Laid-Open No. 2015-179122 and Japanese Patent Laid-Open No. 2014-198465, it is difficult for a user to correctly determine the faulty sheets output to a plurality of paper output destinations and to remove the correct number of sheets, and thus there is a possibility that the normally output sheets are removed and missing pages occur.

SUMMARY

The present invention has been made in view of the above circumstances, and it is an object of the present invention to provide an image forming apparatus, an image forming system, and a non-transitory computer-readable recording medium storing a program, which, even when transfer media that have been determined to be faulty by reading images are outputted to a plurality of output destinations, make it easy to remove the faulty transfer media correctly from the plurality of output destinations by giving an appropriate warning.

To achieve at least one of the abovementioned objects, according to an aspect of the present invention, an image forming apparatus reflecting one aspect of the present invention includes: an image forming section for forming an image on a transfer medium; a conveyance section for conveying the transfer medium; a plurality of output sections to which transfer media are output through the conveyance section; and a control section for controlling image formation and conveyance, wherein the control section is capable of acquiring an image reading result for a transfer medium on which an image is formed and determining whether the transfer medium is faulty, and, if the transfer medium is determined to be faulty and there are a plurality of output destinations for faulty transfer media which are the transfer medium determined to be faulty and transfer media having already been fed after the transfer medium determined to be faulty, gives a warning about removal of the faulty transfer media for each output destination.

To achieve at least one of the abovementioned objects, according to an aspect of the present invention, an image forming system reflecting one aspect of the present invention includes a control section for controlling image formation and conveyance of a transfer medium in an image forming apparatus, wherein the control section is capable of acquiring an image reading result for a transfer medium on which an image is formed and determining whether the transfer medium is faulty, and, if the transfer medium is determined to be faulty and there are a plurality of output destinations for transfer media which are the transfer medium determined to be faulty and transfer media having already been fed after the transfer medium determined to be faulty, gives a warning about removal of the faulty transfer media for each output destination.

To achieve at least one of the abovementioned objects, according to an aspect of the present invention, a non-transitory computer-readable recording medium storing a program reflecting one aspect of the present invention is a non-transitory computer-readable recording medium storing a program to be executed by a control section for controlling an image forming apparatus and characterized in that the program causes a computer to perform; acquiring an image reading result for a transfer medium on which an image is formed and determining whether the transfer medium is faulty, and if it is determined that the transfer medium is faulty and there are a plurality of output destinations for faulty transfer medium which are the transfer medium determined to be faulty and transfer media having already been fed after the transfer medium determined to be faulty, giving a warning about removal of the faulty transfer media for each output destination.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8 is a view for explaining the insertion of the indication sheet in other embodiment;

FIG. 9 is a view for explaining the insertion of the indication sheet in other embodiment;

DETAILED DESCRIPTION OF EMBODIMENTS

Hereinafter, one or more embodiments of the present invention will be described with reference to the drawings. However, the scope of the invention is not limited to the disclosed embodiments The following will explain one embodiment of the present invention based on the attached drawings.

Figure 1:
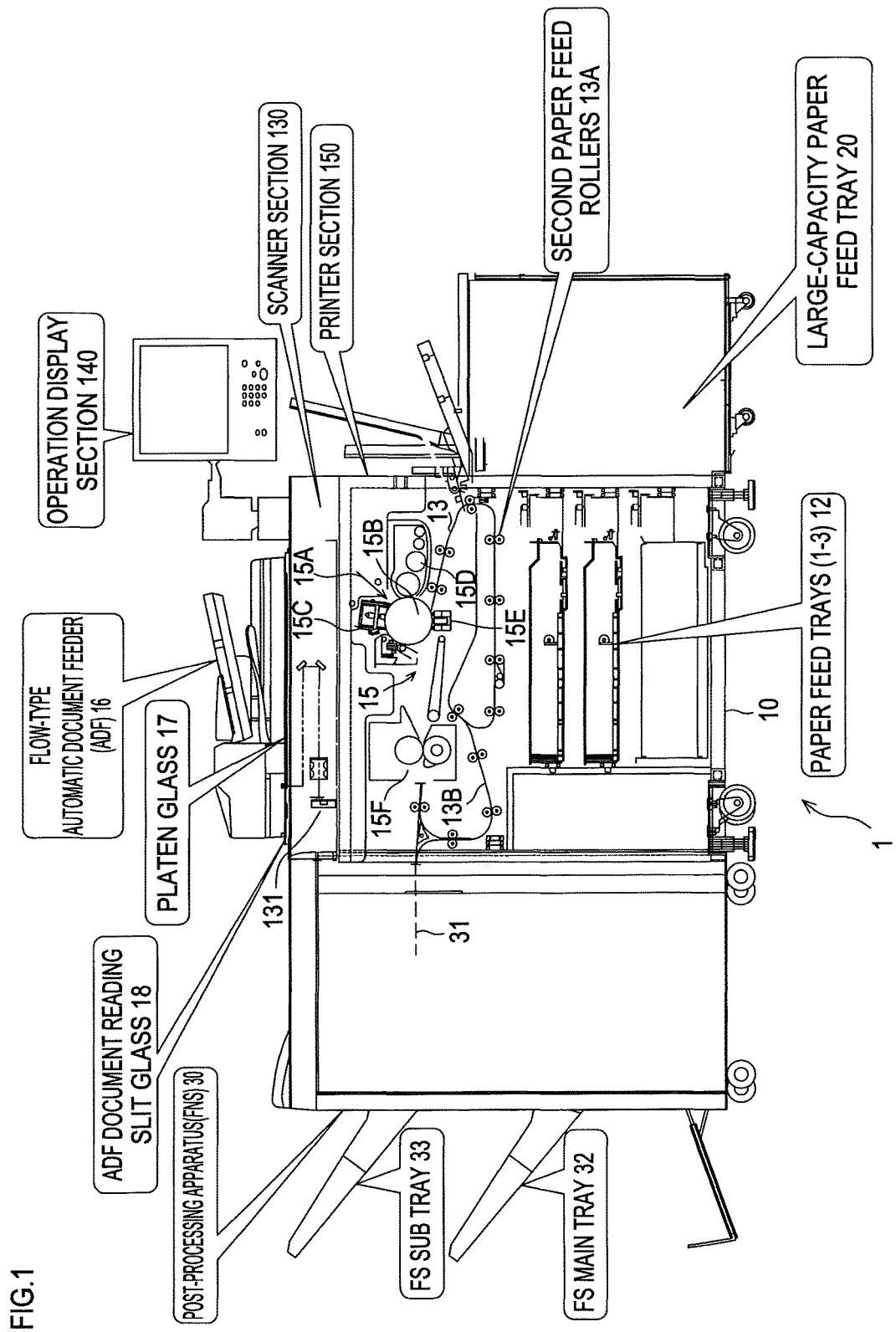
FIG. 1 is a view showing a mechanical outline of an image forming apparatus according to one embodiment of the present invention.

FIG. 1 is a central cross-sectional view of an image forming apparatus 1, and shows a mechanical configuration of the image forming apparatus 1.

The image forming apparatus 1 includes an apparatus main body 10, a large-capacity paper feed tray 20, and a post-processing apparatus (FNS) 30. The large-capacity paper feed tray 20 is connected to the preceding-stage side of the apparatus main body 10, and the post-processing apparatus (FNS) 30 is connected to the post-stage side of the apparatus main body 10. In the image forming apparatus 1, conveyance of sheets and communication between the respective apparatuses are available. It is also possible to build the post-processing apparatus into the apparatus main body 10.

In this embodiment, the image forming apparatus is constituted by the apparatus main body 10, the large-capacity paper feed tray 20, and the post-processing apparatus (FNS) 30. However, the combination of the apparatus main body 10 and other apparatuses is not particularly limited. It is possible that the image forming apparatus is constituted by only the apparatus main body 10, and an image forming system is configured by other apparatuses.

Paper is stored in the large-capacity paper feed tray 20. The large-capacity paper feed tray 20 has a conveying path (not shown), and paper is conveyed on the conveying path and supplied to a conveying path 13 of the apparatus main body 10. In this embodiment, the paper corresponds to a transfer medium of the present invention. In the present invention, the transfer medium is not limited to paper, and is possibly made of cloth, plastic, etc.

Provided on the upper side of the housing of the apparatus main body 10 are a scanner section 130 including a CCD 131, and a flow-type automatic document feeder (ADF) 16. The CCD 131 is capable of reading not only a document set on a platen glass 17, but also a document fed by the flow-type automatic document feeder (ADF) 16 through an ADF document reading slit glass 18.

In addition, on the upper side of the apparatus main body 10, an operation display section 140 including a touch panel on an LCD is provided at a location where the platen glass 17 is not positioned. The operation display section 140 is capable of being operated by an operator and displaying information, and serves as both a display section and an operation section of the present invention. In the present invention, it is also possible to configure the display section and the operation section as separate bodies.

A plurality of paper feed trays (1-3) 12 (three stages in the drawing) are provided in the lower part of the apparatus main body 10. Paper is stored in the paper feed trays (1-3) 12.

The conveying path 13 is provided in the apparatus main body 10, and conveying rollers such as second paper feed rollers 13A are provided in the conveying path 13. The paper fed from the large-capacity paper feed tray 20 or the paper feed tray (1-3) 12 is conveyed on the conveying path 13 by the second paper feed rollers 13A and so on.

An image forming section 15 is provided in the conveying path 13 in the apparatus main body 10. The image forming section 15 includes an LD 15A, a photoreceptor 15B, a charger 15C, a developing unit 15D, a transfer unit 15E, and a fixing unit 15F, etc.

In the image forming section 15, the charger 15C, the developing unit 15D, and the transfer unit 15E are disposed around the photoreceptor 15B. The charger 15C uniformly charges the surface of the photoreceptor 15B. The LD 15A irradiates, with a semiconductor laser, the photoreceptor 15B whose surface has been uniformly charged, and forms an electrostatic latent image on the photoreceptor 15B. The developing unit 15D develops the electrostatic latent image formed on the photoreceptor 15B with a toner material, and forms a toner image on the photoreceptor 15B. The transfer unit 15E transfers the toner image on the photoreceptor 15B to the paper conveyed through the conveying path 13. The paper to which the toner image has been transferred is separated from the photoreceptor 15B and conveyed to the fixing unit 15F. The toner material remaining on the photoreceptor 15B is removed by a cleaning unit (not shown). The fixing unit 15F heats the conveyed paper and fixes the transferred toner image to the front side of the paper. Image formation in the image forming section 15 is carried out by the above operation.

Further, a reverse conveying path 13B branches off from the conveying path 13 on the downstream side of the fixing unit 15F. The reverse conveying path 13B joins the conveying path 13 at a position on the upstream side of the image forming section 15.

When single-sided printing is performed, the paper with the image having been fixed is transmitted to the post-processing apparatus (FNS) 30 and is conveyed as it is. When double-sided printing is performed, the paper after the fixing step is switched back by the reverse conveying path 13B, and a given image is transferred to the back side of the paper in the image forming section 15. Then, the paper with the images formed on both sides is conveyed to the post-processing apparatus (FNS) 30.

The image forming section 15, the paper feed trays (1-3) 12, the large-capacity paper feed tray 20, the conveying path 13, the conveying rollers such as the second paper feed rollers 13A, and a motor (not shown) for driving the conveying rollers constitute a printer section 150.

The post-processing apparatus (FNS) 30 has a conveying path 31 connected to the conveying path 13 of the main body 10. It is possible to provide an image reading section (not shown) in the conveying path 31. The image reading section is configured by a line sensor using a CCD sensor and a spectrophotometer, and is capable of reading the image on the surface of paper and obtaining the reading result.

The post-processing apparatus (FNS) 30 has a post-processing section (not shown), and is capable of performing desired post-processing on the paper conveyed from the apparatus main body 10. The present invention does not particularly limit the content of the post-processing, and it is possible to perform desired post-processing such as stapling, punching, center folding, and bookbinding. Note that it is also possible not to have a post-processing apparatus. Moreover, the post-processing apparatus (FNS) 30 has a conveying path (not shown). The paper on which the image has been printed is conveyed on the conveying path and output without performing post-processing, or after performing post-processing.

The post-processing apparatus (FNS) 30 has an FS main tray 32 and an FS sub tray 33 as paper output destinations. It is possible that the present invention has three or more output destinations.

In this embodiment, the image forming apparatus 1 is constituted by the apparatus main body 10, the large-capacity paper feed tray 20, and the post-processing apparatus (FNS) 30. However, the present invention does not particularly limit the number and types of the apparatuses that constitute the image forming apparatus. For example, it is possible that the image forming apparatus includes a plurality of post-processing apparatuses, or has a relay device and an image reading device between the apparatuses. It is also possible to configure the image forming apparatus by only the apparatus main body 10 without a post-processing apparatus. In an image forming apparatus having no apparatus on the lower stage side, a plurality of paper output destinations are provided in the apparatus main body 10. It is also possible to configure an image forming system of the present invention by combining the apparatus main body 10 and other apparatus, or configure an image forming system of the present invention by the image forming apparatus 1 and an external apparatus 6 described later. Further, it is also possible to configure the image forming system by only the external apparatus 6.

In the image forming apparatus 1, the image reading section is provided in the post-processing apparatus (FNS) 30 to read the image on paper in the image forming apparatus 1. However, it is also possible to read the image by another apparatus different from the image forming apparatus 1.

Figure 2:
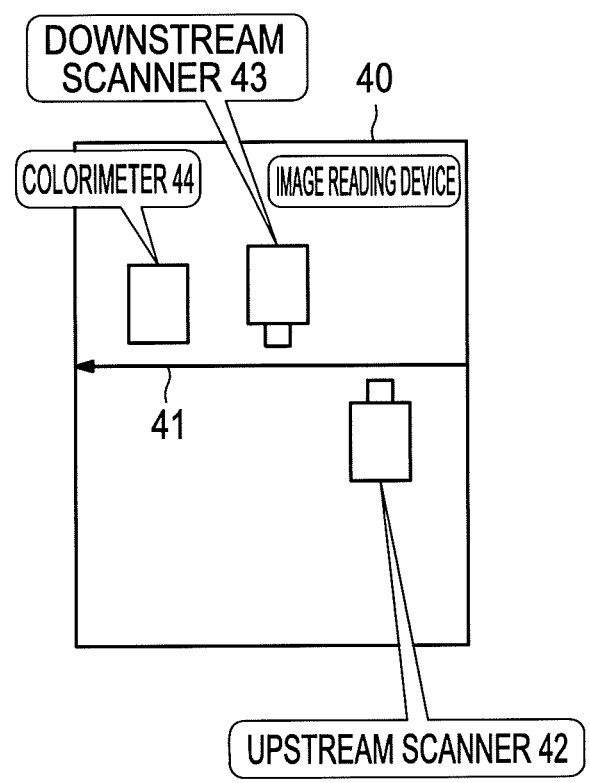
FIG. 2 is a view showing a mechanical outline of an image reading device according to one embodiment of the present invention.

For example, as shown in FIG. 2, it is possible to have an image reading device 40 offline from the image forming apparatus 1 and to read the image on paper by using the image reading device 40.

The image reading device 40 has a conveying path 41 for conveying paper to be read, and an upstream scanner 42, a downstream scanner 43, and a colorimeter 44 arranged in this order in the paper conveying direction in the vicinity of the conveying path 41. The upstream scanner 42 and the downstream scanner 43 are constituted by line sensors such as CCD sensors, and the colorimeter 44 is constituted by a spectrophotometer. The upstream scanner 42 is capable of reading the image on the down surface of the paper. The downstream scanner 43 and the colorimeter 44 are capable of reading the image on the top surface of the paper. In this embodiment, the upstream scanner 42, the downstream scanner 43, and the colorimeter 44 correspond to the image reading section of the present invention. In this embodiment, the image reading section includes a plurality of units, but it is also possible to configure the image reading section by only one unit.

The image reading device 40 of this embodiment is also called ICCU. The ICCU refers to an Image Calibration Control Unit (ICCU) including a CCD scanner and a colorimeter for automatically adjusting the image placement (front to back registration) accuracy and color reproduction stability for the purpose of shortening adjustment time (reducing downtime), stabilizing image quality by easy adjustment, and labor saving.

The reading result obtained by the image reading device 40 is sent to a control section of the image forming apparatus 1 so that the image forming apparatus 1 performs an image quality adjustment in the image forming section 15 based on the reading result received from the image reading device 40. As the image quality adjustment, it is possible to perform desired adjustments, such as a gradation correction and placement. The upstream scanner 42, the downstream scanner 43, and the colorimeter 44 correspond to the image reading section of the present invention.

For the reading result in the offline image reading device 40, it is possible to connect online the image reading device 40 and the image forming apparatus 1 to send a signal of the reading result to the image forming apparatus 1.

Figure 3:
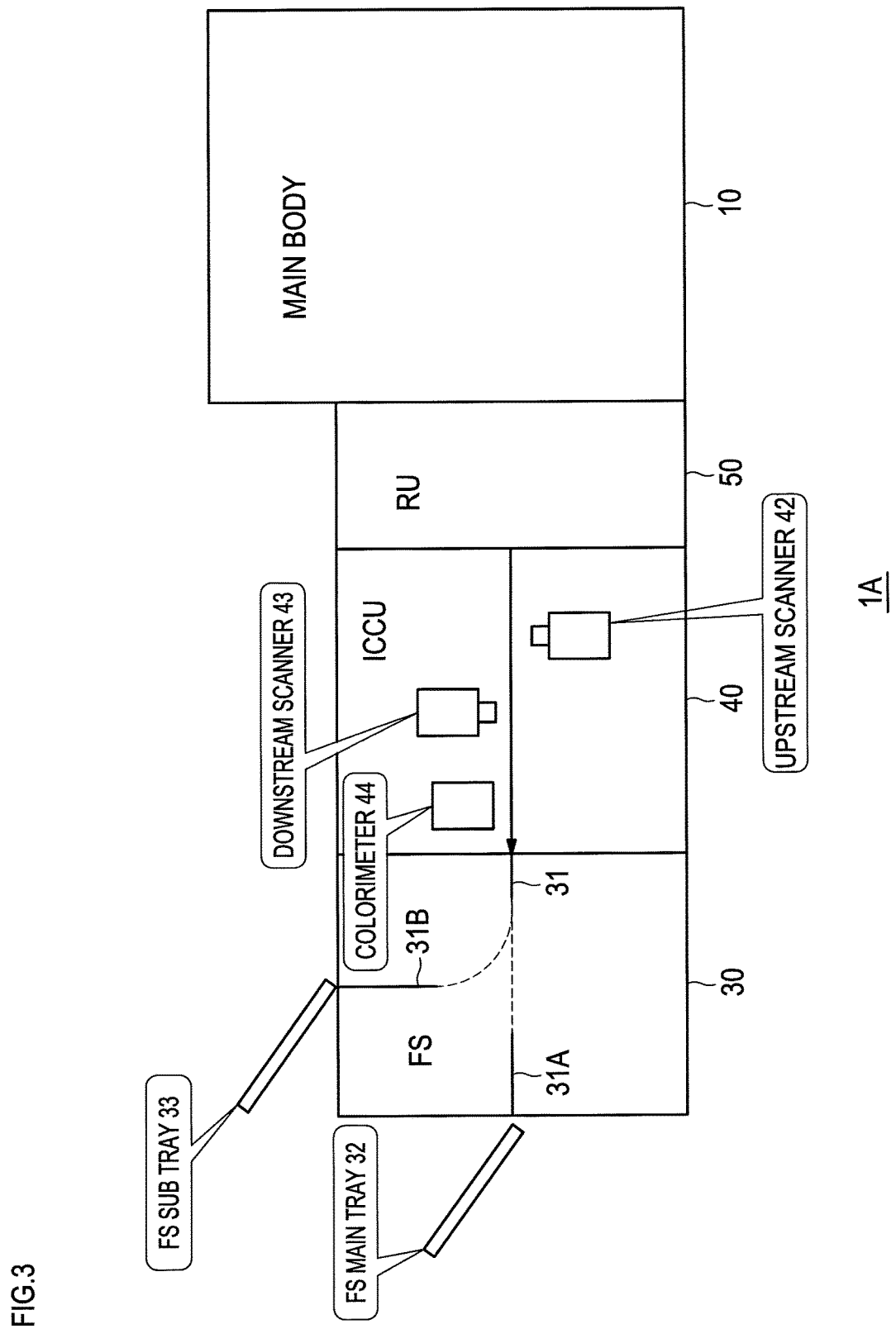
FIG. 3 is a view showing a mechanical outline of an image forming apparatus according to another embodiment of the present invention.

Next, referring to FIG. 3, the following will explain, as another embodiment, an image forming apparatus 1A in which the image reading device 40 is disposed on the lower stage side of the apparatus main body 10. The same configurations as those in the above embodiment will be designated with the same numeral, and explanation thereof will be omitted or simplified.

In the image forming apparatus 1A, a RU (relay device) on the lower stage side of the main body 10, the image reading device 40 on the lower stage side of the RU, and the post-processing apparatus (FNS) 30 on the lower stage side of the image reading device 40 are electrically and mechanically connected.

A RU (relay device) 50 is for relaying paper. It is possible to use a device having mechanisms for having paper on standby, stacking paper, and reversing paper etc.

The image reading device 40 reads an image on sheet sent to the conveying path 41 with the upstream scanner 42, the downstream scanner 43 and the colorimeter 44, and sends the reading result to a later-described control section.

The post-processing apparatus (FNS) 30 is connected to the lower stage of the image reading device 40. The post-processing apparatus (FNS) 30 has the conveying path 31. The conveying path 31 is branched into a conveying path 31A and a conveying path 31B through a post-processing section (not shown). The FS main tray 32 is connected to the conveying path 31A, and the FS sub tray 33 is connected to the conveying path 31B.

The outputting of paper by the post-processing apparatus (FNS) 30 is controlled through a post-processing control section 300 under the control of a control CPU 113, and switching of the paper output destination is controlled at this time.

Next, the functions of an image forming apparatus will be explained based on the block diagram of FIG. 4. It should be noted that each of the functions is applicable to either of the image forming apparatuses 1 and 1A.

Figure 4:
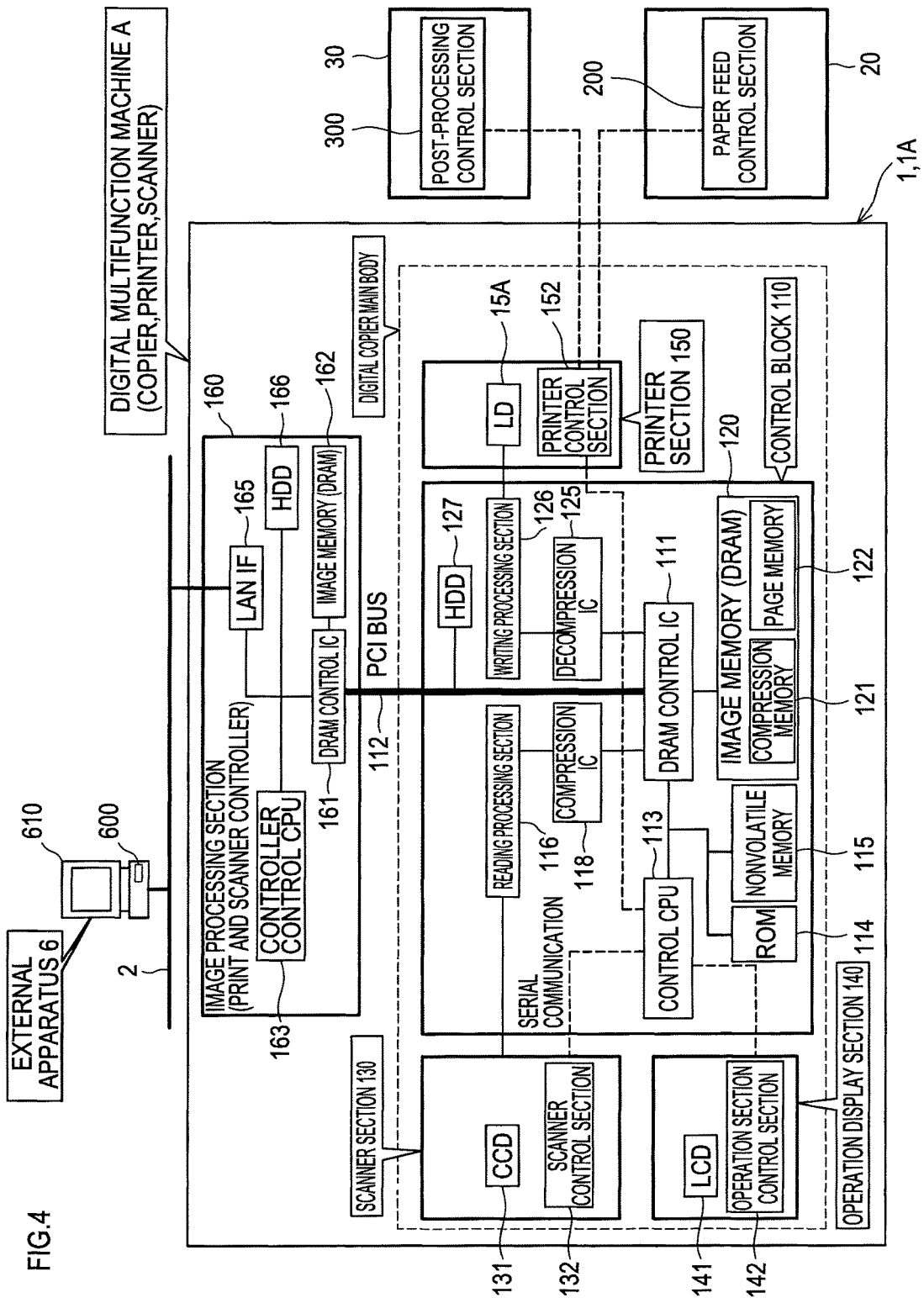
FIG. 4 is a control block diagram according to one embodiment of the present invention.

FIG. 4 shows circuit blocks of an image forming apparatus functioning as a digital multifunction apparatus (copier, printer, scanner), and a network configuration constituting an image forming system.

The image forming apparatus has a digital copier main body, and an image processing section (print and scanner controller) 160. The digital copier main body has a control block 110, a scanner section 130, an operation display section 140, and the printer section 150. The image processing section (print and scanner controller) 160 processes data input from outside.

The external apparatus 6 is connected to the image forming apparatus 1 through a network 2. The external apparatus 6 includes an external apparatus control section 600, and an external apparatus display section 610. The external apparatus control section 600 is capable of controlling the image forming apparatus 1. The image forming apparatus 1 and the external apparatus 6 constitute an image forming system of the present invention. Note that it is also possible to configure the image forming system by only the external apparatus 6.

The control block 110 has a PCI bus 112. The PCI bus 112 is connected to the image processing section (print and scanner controller) 160, and a DRAM control IC 111 is connected to the PCI bus 112. An image memory 120 is connected to the DRAM control IC 111. The image memory 120 is composed of a compression memory 121 and a page memory 122. The compression memory 121 is a memory for storing job management information, and compressed image data of documents etc. The page memory 122 temporarily stores page image data to be printed prior to image formation.

An HDD 127 is connected to the PCI bus 112. The HDD 127 stores jobs created by the image forming apparatus 1 and the external apparatus 6. The HDD 127 is capable of storing a plurality of jobs. Each job includes information about the entire job, image data, and print conditions.

The control block 110 has a control CPU 113. A DRAM control IC 111 is connected to the control CPU 113.

A ROM 114 and a nonvolatile memory 115 are connected to the control CPU 113. Stored in a readable and rewritable form in the nonvolatile memory 115 are initial print setting information of the image forming apparatus 1, mechanical setting information such as output profile information and process control parameters, threshold values and conditions used in determining fault based on the read image, various user set values, paper setting information (predetermined image quality standards such as paper size and paper type) for each paper feed tray, job management information, etc. Moreover, the nonvolatile memory 115 is capable of storing the page position and the paper output destination of paper determined to be faulty based on the image reading result. It is also possible to store these contents in a RAM (not shown) or the HDD 127. In the ROM 114, a program for causing the control CPU 113 to execute a predetermined operation is stored in a readable form. It is possible that the program is stored in the nonvolatile memory 115 or the HDD 127. The ROM 114 or the other memory in which the program is stored corresponds to a non-transitory computer-readable recording medium storing a program.

The ROM 114, the nonvolatile memory 115, the HDD 127, and the RAM (not shown) configure a storage section.

The control CPU 113 is capable of reading nonvolatile data in the ROM 114 or the nonvolatile memory 115, and also capable of writing desired data as nonvolatile data in the nonvolatile memory 115. The control CPU 113 controls the operations of the respective sections of the image forming apparatus 1 according to the above mechanical setting information, print setting information, job management information, and so on.

The control CPU 113 controls the entire image forming apparatus 1, and configures the control section of the present invention with the programs executed by the control CPU 113, the ROM 114, the nonvolatile memory 115, and so on. The control CPU 113 is capable of providing control to realize misalignment correction and image quality adjustment functions. Additionally, the control CPU 113 performs management control, such as reservation and execution of jobs stored in the HDD 127 and the compression memory 121.

Data related to jobs, paper setting information for each paper feed tray, paper profile information, control parameters and so on are stored in the ROM, nonvolatile memory 115, HDD 127, RAM (not shown), etc. The programs to be executed by the control CPU 113 include the program of the present invention. It is possible that the program is stored in a portable recording medium and is movable.

Further, the control CPU 113 is capable of receiving the image reading result. The image reading result is used, for example, for a real-time front/back adjustment and a gradation adjustment.

For the real-time front/back adjustment, for instance, register marks (solid output) are printed on the cut margin portion of paper, for example, all surfaces are read by the ICCU (upstream scanner and downstream scanner), and feedback is provided to the outputting job. The subjects to be corrected are main scanning shift, sub scanning shift, magnification in the paper passing direction, magnification in the paper crossing direction, inclination, and rotation.

Regular front/back adjustment adjusts the back side with respect to the front side, but the real-time adjustment makes a positional adjustment independently to each of the front side and the back side with respect to the target values. The present invention uses the real-time positional adjustment as an example.

For the gradation adjustment, gradation patches (YMCK/RGB Pb) are printed on the edge of the paper, the cut margin portion of the paper, and is read by the ICCU (downstream scanner).

For the reading position of the gradation patch, position detection is performed on the basis of corner/center register marks. Correction values are kept under the same conditions as for the output paper density adjustment (for each screen/paper type/paper color sensor), and corrections are made. As for the correction values, gradation correction values are calculated by using data of two sheets (eight kinds of patches) of "YMCK" and "RGB Pb" as one set.

The control CPU 113 is capable of making a position adjustment and an image quality adjustment based on the reading result of the image and is also capable of determining fault. As described above, it is possible to determine fault if an abnormality is detected or adjustment failure occurs in reading the register marks for image quality adjustment and placement. Moreover, it is also possible to determine fault by comparing the image data with the read image data and detecting scratches, missing portions, bent paper etc. Further, when a fault was detected, paper having already been fed (the already fed paper) after the faulty paper is also determined as faulty paper, and if the output destination of the faulty paper is more than one, the control CPU 113 performs control to give a warning about removal of the faulty paper for each output destination. Examples of the warning are a display in the display section, voice, sending a notification to outside, and insertion of an indication sheet as to be described later. At this time, the number of sheets of spoiled sheets is counted for each paper output destination, the number of sheets to be removed is given, and an indication sheet is inserted at the time of continuing the job output.

The scanner section 130 includes the CCD 131 for performing optical reading, and the scanner control section 132 for controlling the entire scanner section 130. The scanner control section 132 is connected to the control CPU 113 so as to enable serial communication. Further, the CCD 131 is connected to a reading processing section 116. The image data read by the CCD 131 is processed by the reading processing section 116. A compression IC 118 for compressing image data is connected to the reading processing section 116. The compression IC 118 is connected to the DRAM control IC 111.

The operation display section 140 includes an LCD 141, and an operation section control section 142. The LCD 141 has a touch panel, and the operation section control section 142 controls the entire operation display section. The operation display section 140 serves for both display and operation, and the LCD 141 is provided in the operation display section 140. The operation display section 140 corresponds to the display section of the present invention. The operation section control section 142 is connected to the control CPU 113 so as to enable serial communication. In the operation display section 140, under the control of the control CPU 113, the LCD 141 allows mechanical setting inputs, such as print setting and operation control conditions in the image forming apparatus, setting about outputs, setting of paper information (such as size and paper type) for each paper feed tray, output mode setting (for example, normal copy mode and confirmation copy mode), image quality adjustment setting, setting for adjustment image, and so on. Further, the operation display section 140 is capable of displaying desired information, such as display of setting details, a list of reserved jobs, and display of a message. As the display of a message, when fault was determined based on the image reading result and the paper was output, it is possible to display a warning about the paper output destination, the number of the faulty sheets, etc.

In addition, an decompression IC 125 is connected to the DRAM control IC 111, a writing processing section 126 is connected to the decompression IC 125, and the writing processing section 126 is connected to an LD 15A (laser diode) of the printer section 150. The decompression IC 125 decompresses the compressed image data. The writing processing section 126 processes writing data to be used for the operation of the LD 15A. Further, the printer section 150 includes a printer control section 152 for controlling the entire printer section 150 (such as paper feeding, image formation, paper output, and post-processing). The printer control section 152 is connected to the above-described control CPU 113. The printer control section 152 operates according to a control instruction of the control CPU 113, and controls the printer section 150.

A DRAM control IC 161 of the image processing section (print and scanner controller) 160 is connected to the PCI bus 112. When the image forming apparatus is used as a network printer or a network scanner, the image processing section (print and scanner controller) 160 receives image data from the external apparatus 6 or the like on the network 2 in the image forming apparatus 1, or sends image data obtained by the scanner 130 to the external apparatus 6.

In the image processing section (print and scanner controller) 160, an image memory (DRAM) 162 composed of a DRAM or the like is connected to the DRAM control IC 161. The image processing section (print and scanner controller) 160 has a common bus. The DRAM control IC 161, a controller control CPU 163, a LAN interface 165, and an HDD 166 are connected to the common bus. The controller control CPU 163 controls the entire image processing section (print and scanner controller) 160. The LAN interface 165 is connected to the network 2.

It is possible to use the external apparatus 6 as a device functioning as a terminal, or a management device for managing the image forming apparatus. The external apparatus 6 has an external apparatus control section 600 for controlling the entire external apparatus 6. The external apparatus control section 600 is configured with a CPU, a program for operating the CPU, a storage section etc. The external apparatus control section 600 is also capable of managing the image forming apparatus by communicating with the image forming apparatus. In this case, the external apparatus control section 600 functions as a control section for managing the image forming apparatus, and the external apparatus 6 corresponds to the management device of the present invention. It should be noted that the network 2 can be a network used as WAN as well as LAN, and is either wireless or wired.

In the case where the external apparatus 6 is used as a management device, it is possible to perform a control of determining fault for the image reading result, and, if fault is determined, paper having already been fed after the faulty paper is also determined as faulty paper, and if the paper output destination of the faulty paper is more than one, it is possible to perform a control of giving a warning about paper removal for each paper output destination. In this case, the external apparatus control section 600 functions as the control section of the present invention.

The external apparatus 6 either directly controls the image forming apparatus, or gives an instruction about the content of control to the image forming apparatus so that the content of control is executed by the control section of the image forming apparatus according to the content of instruction.

It is possible to connect other apparatus to the network 2. For example, it is possible to connect the image reading device 40 to the network and acquire the reading result obtained by reading an image formed by the image forming apparatus from the image reading device 40. In this case, the reading result is obtained through the LAN interface 165.

Next, the basic operation of the image forming apparatus will be described.

First, fetching of image data will be explained.

Firstly, the following will explain a case where the scanner section 130 reads an image and generates image data in the image forming apparatus 1. The image is optically read from the document by the CCD 131 in the scanner section 130. At this time, the operation of the CCD 131 is controlled by the scanner control section 132 which receives a command from the control CPU 113. The reading of the document is performed by the automatic document feeder (ADF) 16, or by placing the document on the platen glass 17. The control CPU 113 operates according to a program, and issues a command to the scanner section 130 based on an operation through the operation display section 140.

The image data acquired by the CCD 131 is subjected to predetermined processing in the reading processing section 116. When reading the image data, a combined JOB unit is created from the received data, and the data is compressed by the compression IC 118, and then stored in the compression memory 121 of the image memory (DRAM) 120 through the DRAM control IC.

When saving the image data in the HDD 127, the image data stored in the compression memory 121 is stored in the HDD 127 through the DRAM control IC 111.

When storing the image data, it is possible to store print conditions such as setting information about the job in association with the image data.

The following will explain about acquiring image data from outside or acquiring image data from a device connected to the network 2. Examples of image data include image data generated by an application program in the external apparatus 6, and image data generated by other image forming apparatus.

The image data input from the network 2 is received by the image processing section (print and scanner controller) 160 through the LAN interface 165, and temporarily stored in the image memory (DRAM) 162 or the HDD 166 by the DRAM control IC 161. The data in the image memory (DRAM) 162 or the HDD 166 is transferred to the DRAM control IC 111 through the PCI bus 112, and temporarily stored in the page memory 122. The data stored in the page memory 122 is sequentially sent to the compression IC 118 through the DRAM control IC 111, compressed, and stored in the compression memory 121 through the DRAM control IC 111. When storing data in the HDD 127, the data stored in the compression memory 121 is stored in the HDD 127 through the DRAM control IC 111.

When printing is performed by the image forming apparatus 1, printing is carried out according to the print conditions of the job. First, based on the job management information, the image data stored in the compression memory 121 is sent to the decompression IC 125 through the DRAM control IC 111 to decompress the data. When the image of image data stored in the HDD 127 is to be output, the image data is temporarily stored in the compression memory 121 through the DRAM control IC 111 and sent to the decompression IC 125 through the DRAM control IC 111 to decompress the data.

The decompressed data is sent to the writing processing section 126 through the DRAM control IC 111 to generate writing data, and the LD 15A writes the data on the photoreceptor 15B. In the printer section 150, the printer control section 152 which received the instruction from the control CPU 113 controls the respective sections, such as the paper feed trays (1-3) 12, the large-capacity paper feed tray 20, the conveyance section, and the image forming section 15. In the large-capacity paper feed tray 20, paper feeding is controlled by a paper feed control section 200 through the printer control section 152. In the printer section 150, paper feeding, image formation, transfer to paper, fixing, conveyance to the post-processing apparatus (FNS) 30 through the conveying path, and post-processing by the post-processing apparatus (FNS) 30 are performed sequentially for print output. A paper output destination is selected through the post-processing control section 300 under the control of the image control CPU 113, and the printed paper is output to the FS main tray 32 or the FS sub tray 33 through the conveying path 31A or the conveying path 31B. For example, a paper output destination is set for each job, or for each page, according to the print conditions of the job, or if sheet spoilage occurs, the paper output destination is switched and the paper is output to a paper output destination different from the usual paper output destination.

When executing the job, if fault is determined by the control section based on the image reading result read by the image reading device 40, paper after the spoiled sheet which has already been fed and is remaining in the image forming apparatus is also determined as spoiled sheet and output to a predetermined paper output destination, for example, a paper output destination different from the usual paper output destination.

Figure 5:
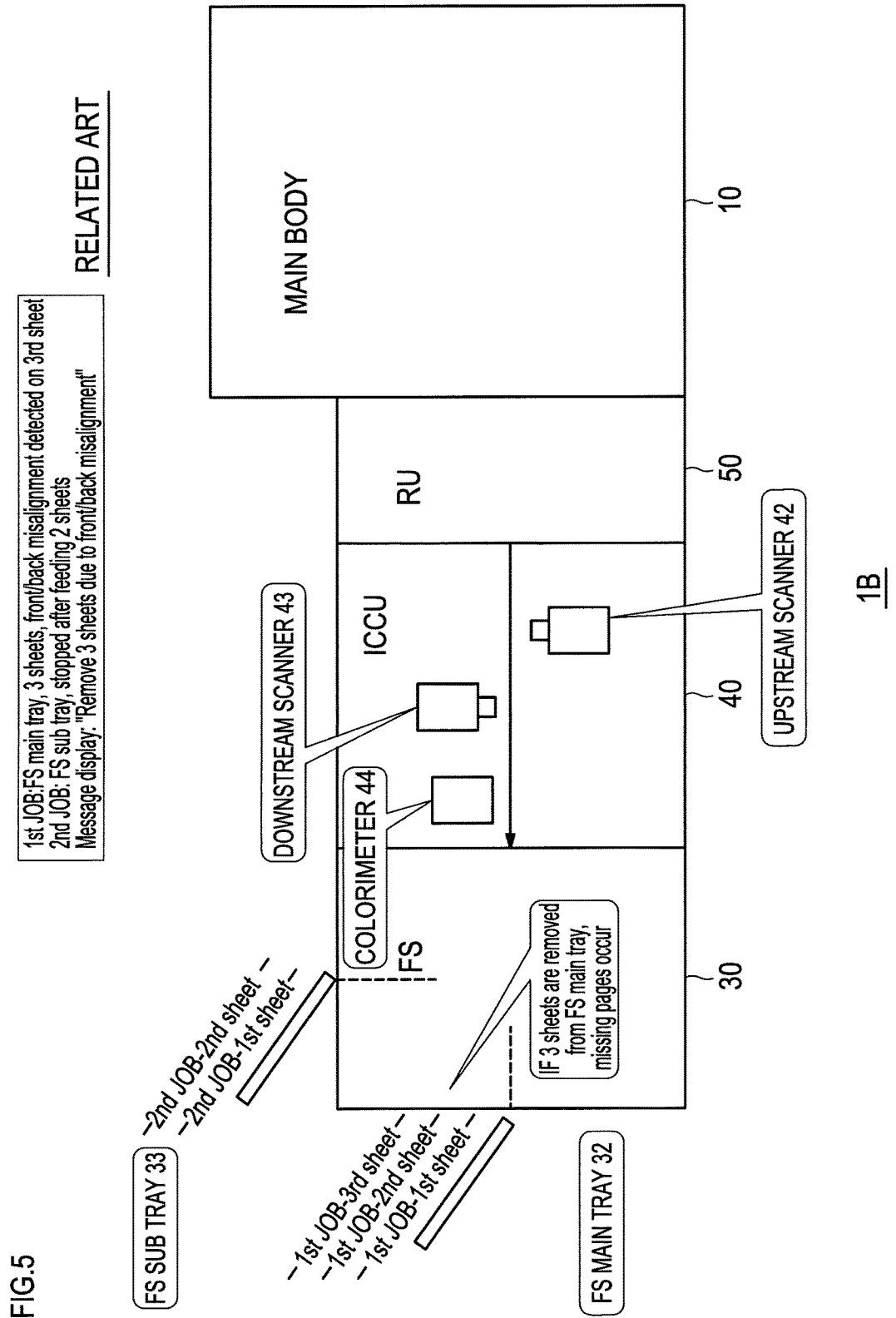
FIG. 5 is a view for explaining the state of a message display given when a transfer medium was determined to be faulty and there are a plurality of output destinations for faulty transfer media including the transfer medium determined to be faulty and transfer media having already been fed after the transfer medium determined to be faulty in a relevant apparatus other than the present invention.

Next, referring to FIG. 5, the following will explain the operation status of related arts other than the present invention when fault was determined by the control section based on the image reading result and there are a plurality of output destinations for faulty transfer media, the faulty transfer media including the transfer medium and transfer media fed already after the faulty transfer medium. Note that, in this image forming apparatus 1B, the control section does not perform warning control as in the present invention.

In the image forming apparatus 1B, if front/back misalignment or the like is detected (assumed for the Xth sheet), sheets (assumed to be N sheets) having already been fed after the Xth sheet are also output as spoiled sheets.

In this case, the number of the spoiled sheets is stored and a message "Remove N+1 sheets due to front/back misalignment" is displayed to ask the user to remove the spoiled sheets.

However, if the above message is displayed when N sheets were output to different paper output destinations over jobs, there is a possibility that the specified number of sheets is removed from a single paper output destination. In this case, the properly output sheets are also removed, resulting in missing pages.

An example in which X=3rd sheet and N=2 sheets is shown below.

1st JOB: FS main tray, 3 sheets, front/back misalignment detected on 3rd sheet

2nd JOB: FS sub tray, stopped after feeding 2 sheets

Message display: "Remove 3 sheets due to front/back misalignment"

In this case, if 3 sheets are removed as spoiled sheets from the FS main tray, satisfactory sheets are removed.

The above example in which the problem occurs over jobs is shown as the generally assumed case. However, it is possible to set a paper output destination for each sheet, such as, for example, "1-3 sheets: main tray, 4-5 sheets: sub tray". The same problem can occur even within one job.

Figure 6:
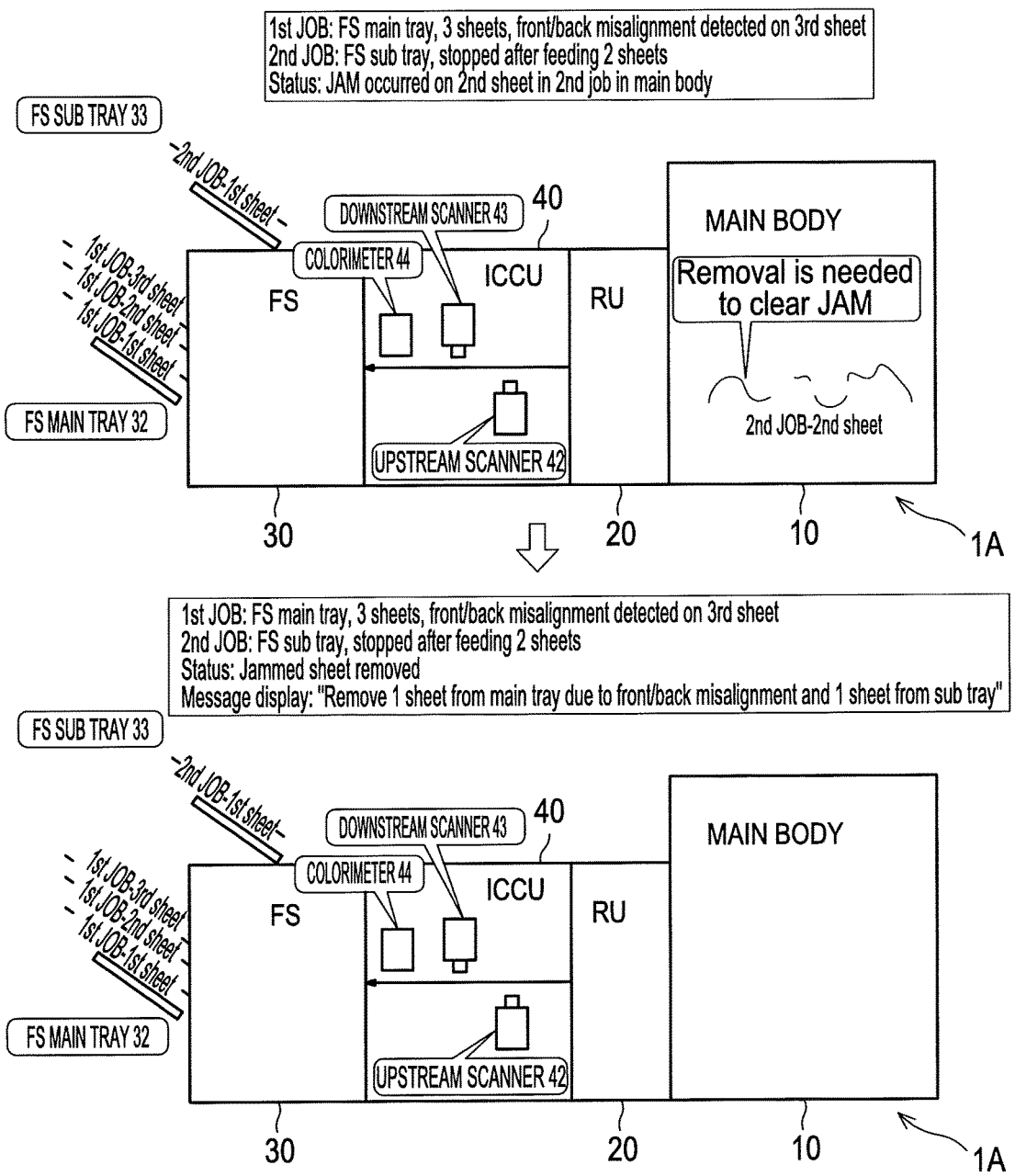
FIG. 6 is a view for explaining a message display for each output destination when a transfer medium was determined to be faulty and there are a plurality of output destinations for faulty transfer media including the transfer medium determined to be faulty and transfer media having already been fed after the transfer medium determined to be faulty in one embodiment of the present invention.

Next, the operation status in this embodiment will be described based on FIG. 6.

In this embodiment, a paper removal message is displayed as a warning.

In the display, the message "Remove 1 sheet from main tray due to front/back misalignment and 2 sheets from sub tray" is displayed. However, if a sheet which has already been fed becomes a jammed sheet, a number calculated by subtracting the number of jammed sheet(s) is displayed as explained below.

1st JOB: FS main tray, 3 sheets, front/back misalignment detected on 3rd sheet

2nd JOB: FS sub tray, stopped after feeding 2 sheets

Status: JAM occurred on 2nd sheet in 2nd job in main body

If the jammed sheet is removed from this status,

1st JOB: FS main tray, 3 sheets, front/back misalignment detected on the 3rd sheet 2nd JOB: FS sub tray, stopped after feeding 2 sheets Status: Jammed sheet removed Message display: "Remove 1 sheet from main tray due to front/back misalignment and 1 sheet from sub tray"

According to the above display, it is possible to remove the spoiled sheets properly from each paper output destination, and to prevent missing pages. The paper output destination corresponds to the output destination of the present invention.

In the above-described embodiment, a warning is displayed in the display section. However, it is also possible to give a notification by voice or to send a notification to an external apparatus.

It is also possible to give a warning by inserting paper instead of giving a notification as a warning. This embodiment will be described below.

After a job output is stopped upon determination of fault such as detection of front/back misalignment, it is also possible to continue the job by recovery without removing the spoiled sheet.

In this case, it is necessary to remove the spoiled sheet after finishing the job. At this time, paper on which the number of sheet(s) needed to be removed is printed is inserted. This is an indication sheet.

Figure 7:
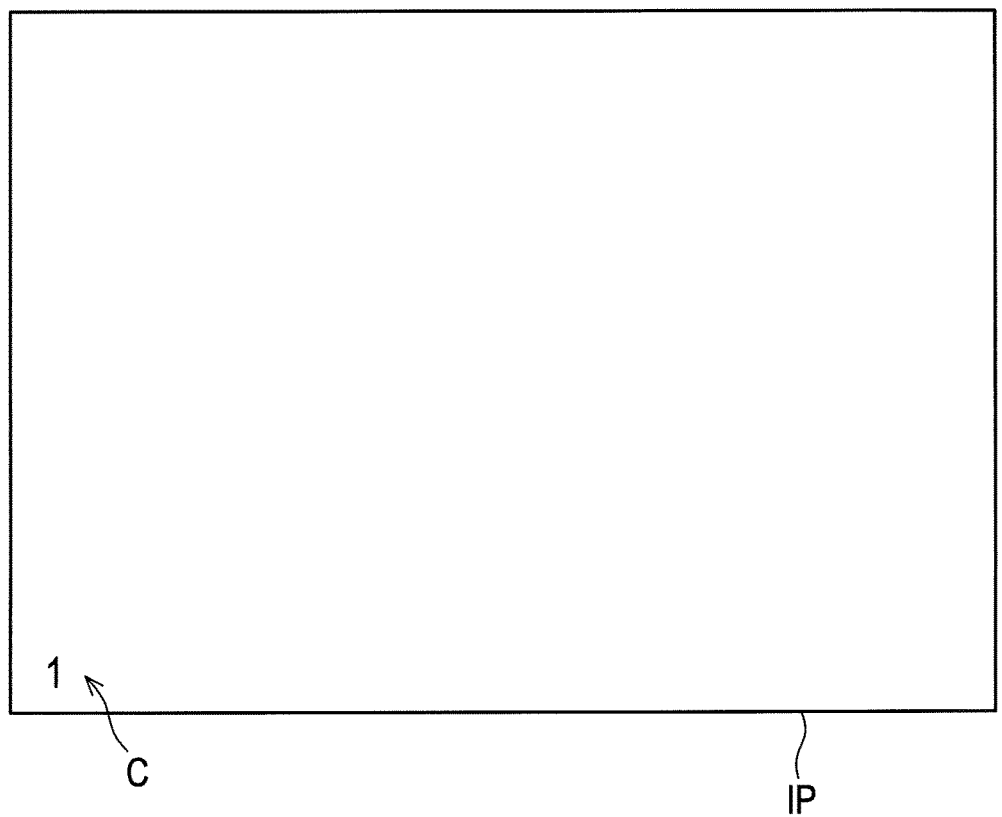
FIG. 7 is a view showing an insertion sheet for indication purpose used in other embodiment.

FIG. 7 shows a sample when the number of sheet(s) to be removed is one.

FIG. 7 shows an insertion sheet IP on which the number C of spoiled sheet(s) is printed as "1". The insertion sheet IP can be made noticeable by using different type of paper from normal paper, changing the facing direction, or shifting the paper output position.

The improvements of operation by the insertion of the indication sheet will be explained with reference to FIGS. 8 to 10.

As shown in the upper part of FIG. 8,

1st JOB: FS main tray, 3 sheets, front/back misalignment detected on 3rd sheet

2nd JOB: FS sub tray, stopped after feeding 2 sheets

Status: Stopped due to abnormality detection after completion of outputting 2nd sheet in second job The next status is shown in the lower part of FIG. 8.

1st JOB: FS main tray, 3 sheets, front/back misalignment detected on 3rd sheet

2nd JOB: FS sub tray, stopped after feeding 2 sheets

Status: Indication sheet on which "Remove 1 sheet" is printed was inserted in FS main tray The next status is shown in the upper part of FIG. 9.

1st JOB: FS main tray, 3 sheets, front/back misalignment detected on 3rd sheet

2nd JOB: FS sub tray, stopped after feeding 2 sheets

Status: Indication sheet on which "Remove 2 sheets" is printed was inserted in FS sub tray Moreover, the next status is shown in the lower part of FIG. 9.

1st JOB: FS main tray, 3 sheets, front/back misalignment detected on 3rd sheet

2nd JOB: FS sub tray, stopped after feeding 2 sheets

Status: Recovery of FS main tray was started

Figure 10:
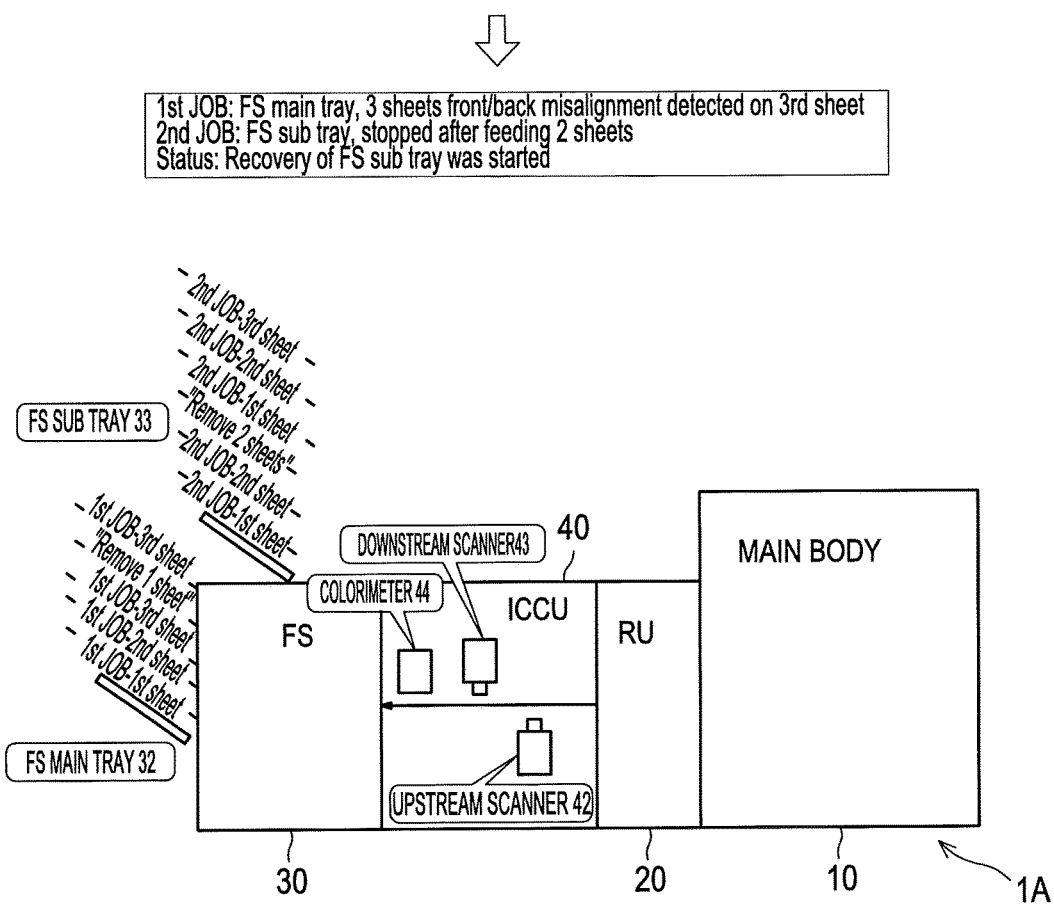
FIG. 10 is a view for explaining the insertion of the indication sheet in other embodiment.
Figure 11:
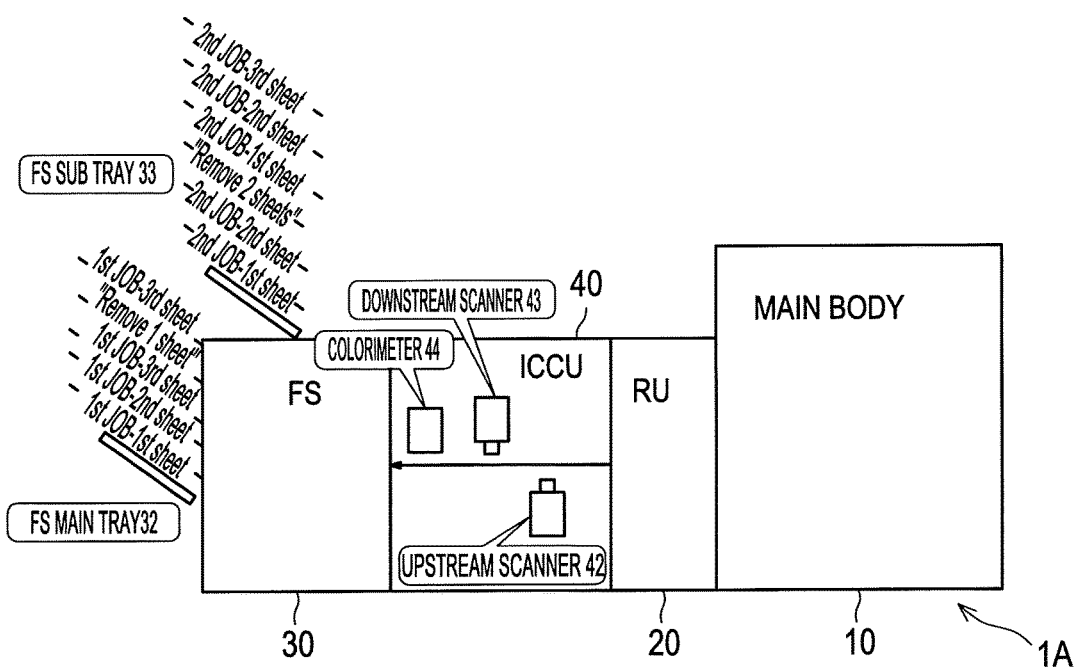
FIG. 11 is a view for explaining a display as a warning and the insertion of the indication sheet in other embodiment of the present invention.

Further, the next status is shown in FIG. 10.

1st JOB: FS main tray, 3 sheets, front/back misalignment detected on 3rd sheet

2nd JOB: FS sub tray, stopped after feeding 2 sheets

Status: Recovery of FS sub tray was started

The above-mentioned indication sheet makes it easy to correctly remove the spoiled sheet(s) from each paper output destination.

The above embodiments explained the cases where a notification was given, or paper was inserted, as a warning. However, it is also possible to give a warning by combining the notification and the insertion of paper. A warning is given by combining voice notification and insertion of indication sheet in the following case.

1st JOB: FS main tray, 3 sheets, front/back misalignment detected on 3rd sheet

2nd JOB: FS sub tray, 3 sheets, stopped after feeding 2 sheets

Status: After automatic recovery, 1st job and 2nd job were finished correctly Indication sheets inserted Voice: "1 indication sheet was inserted in main tray, and 1 indication sheet was inserted in sub tray"

Figure 12:
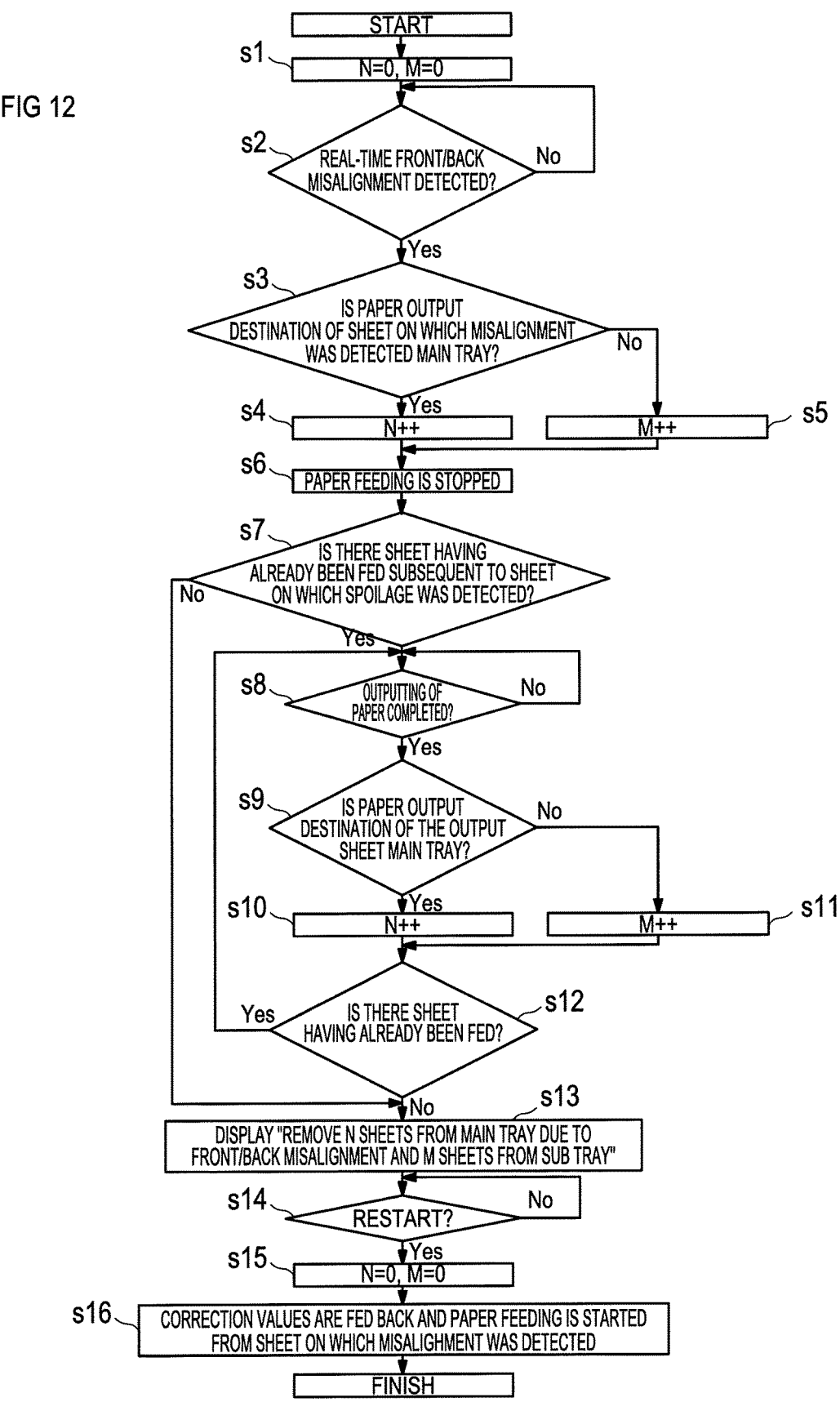
FIG. 12 is a flowchart showing a procedure for displaying a message as a warning in one embodiment of the present invention.

Next, a procedure for displaying a message as a warning will be explained with reference to the flowchart of FIG. 12. The following procedure is executed under the control of the control section.

When the process starts, 0 is input as the initial value for variables N and M (step s1). Note that N indicates the counted number of spoiled sheets of paper in the main tray, and M represents the counted number of spoiled sheets of paper in the sub tray.

Next, a determination is made as to whether real-time front/back misalignment was detected (step s2). The real-time front/back misalignment is mentioned here as the detail of fault, but the present invention is not limited to this and can determine image quality fault, dirt on the image, etc.

If real-time front/back misalignment was not detected (No in step s2), the process stands by until front/back misalignment is detected. If real-time front/back misalignment was detected (Yes in step s2), it is determined whether the paper output destination of the sheet on which the misalignment was detected is the main tray (step s3). If it is the main tray (Yes in step s3), 1 is added to N (step s4), and the process proceeds to step s6. If it is not the main tray (No in step s3), 1 is added to M (step s5), and the process proceeds to step s6. The paper output destination is determined by the print conditions and settings for faulty paper. The same applies to the following.

In step s6, paper feeding is stopped, and then it is determined whether there is a sheet having already been fed subsequent to the sheet on which spoilage was detected (step s7). If there is a sheet having already been fed subsequent to the sheet on which spoilage was detected (Yes in step s7), it is determined whether the outputting of paper has been completed (step s8). If there is no sheet having already been fed subsequent to the sheet on which spoilage was detected (No in step s7), a message to be described later is displayed in step s13. "sheet having already been fed" corresponds to "sheet having already been sent" in the present invention.

In step s8, if the outputting of paper has not been completed (No in step s8), the process stands by until the completion of outputting of paper. If the outputting of paper has been completed (Yes in step s8), it is determined whether the paper output destination of the output sheet is the main tray (step s9).

If the paper output destination of the output sheet is the main tray (Yes in step s9), 1 is added to N (step s10), and it is determined whether there is a sheet having already been fed (step s10). If the paper output destination of the output sheet is not the main tray (No in step s9), 1 is added to M (step s11), and it is determined whether there is a sheet having already been fed (step s12).

If there is a sheet having already been fed in step s12 (Yes in step s12), the process returns to step s8, and it is determined whether the outputting of paper has been completed. If there is no sheet having already been fed (No in step s12), the message "Remove N sheets from main tray due to front/back misalignment and M sheets from sub tray" is displayed in the display section (step s13). Next, it is determined whether to restart (step s14). If determined not to restart (No in step s14), the process waits until restart. If determined to restart (Yes in step s14), 0 is input for N and M (step s15), the correction values are fed back, and paper feeding is started from the sheet on which the misalignment was detected (step s16) to prepare for reprinting, and then the process is finished.

Figure 13:
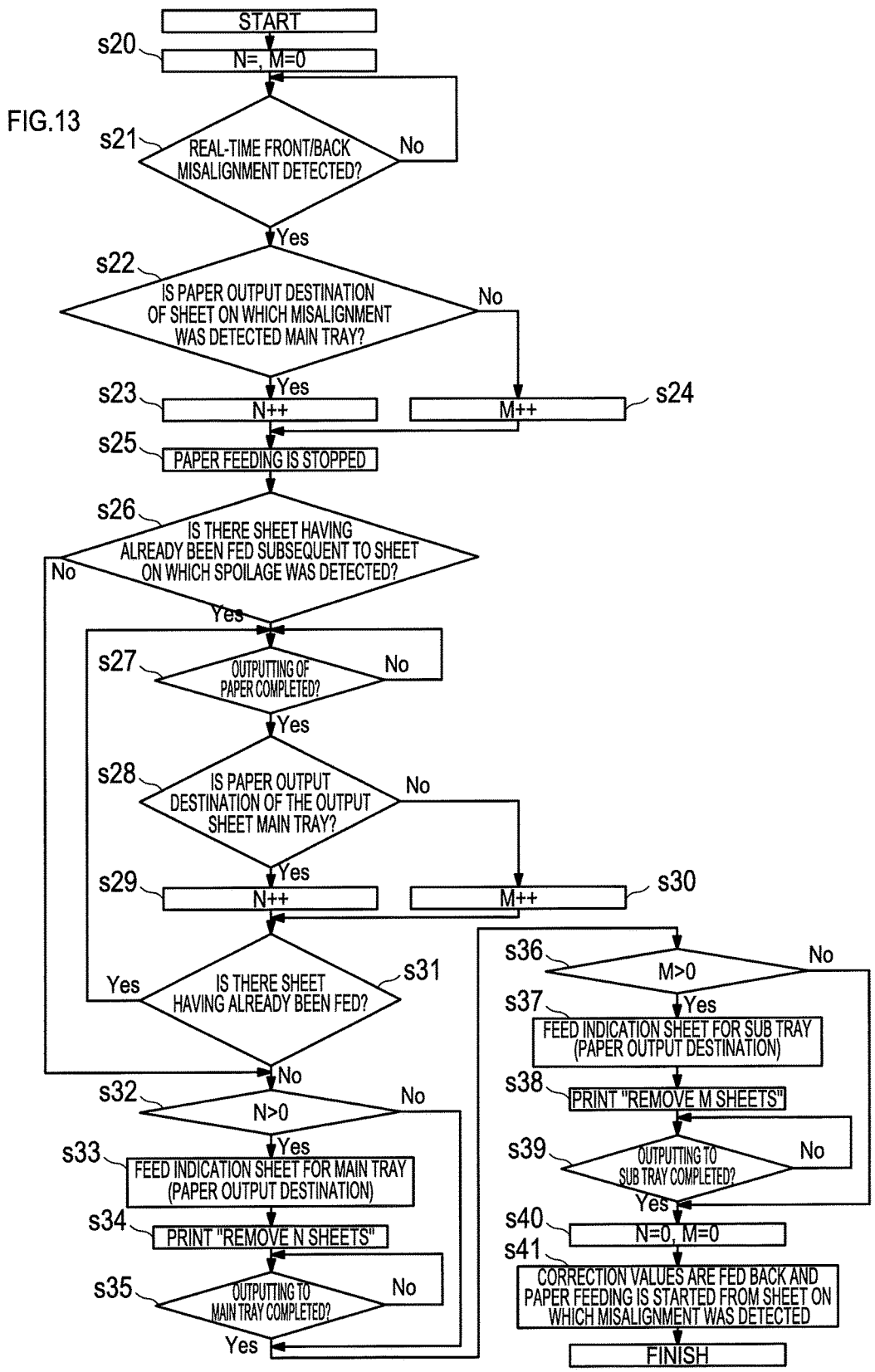
FIG. 13 is a flowchart showing a procedure for inserting an indication sheet as a warning in one embodiment of the present invention.

Next, the procedure of inserting an indication sheet will be explained with reference to the flowchart of FIG. 13. The following procedure is executed under the control of the control section.

When the process starts, 0 is input as the initial value for variables N and M (step s20). Similarly to the above, N indicates the counted number of spoiled sheet(s) in the main tray, and M represents the counted number of spoiled sheet(s) in the sub tray.

Next, it is determined whether real-time front/back misalignment was detected (step s21). Note that real-time front/back misalignment is mentioned here as the detail of fault, but the present invention is not limited to this.

If real-time front/back misalignment was not detected (No in step s21), the process stands by until it is detected. If real-time front/back misalignment was detected (Yes in step s21), it is determined whether the paper output destination of the sheet on which the misalignment was detected is the main tray (Step s22). If it is the main tray (Yes in step s22), 1 is added to N (step s23), and the process proceeds to step s25. If it is not the main tray (No in step s23), 1 is added to M (step s24), and the process proceeds to step s25.

In step s25, paper feeding is stopped, and then it is determined whether there is a sheet having already been fed subsequent to the sheet on which spoilage was detected (step s26). If there is a sheet having already been fed subsequent to the sheet on which spoilage was detected (Yes in step s26), it is determined whether the outputting of paper has been completed (step s27). If there is no sheet having already been fed subsequent to the sheet on which spoilage was detected (No in step s26), it is determined whether N>0 in step s32.

In step s27, if the outputting of paper has not been completed (No in step s27), the process waits until the outputting of paper has been completed. If the outputting of paper has been completed (Yes in step s27), it is determined whether the paper output destination of the output sheet is the main tray (step s28).

If the paper output destination of the output sheet is the main tray (Yes in step s28), 1 is added to N (step s29), and it is determined whether there is a sheet having already been fed (step s31). If the paper output destination of the output sheet is not the main tray (No in step s28), 1 is added to M (step s30), and it is determined whether there is a sheet having already been fed (step s31).

If there is a sheet having already been fed in step s31 (Yes in step s31), the process returns to step s27 to determine whether the outputting of paper has been completed. If there is no sheet having already been fed (No in step s31), it is determined whether N>0 (step s32). If N>0 is not satisfied (No in step s32), the process proceeds to step s36 to determine whether M>0.

If N>0 is satisfied in step s32 (Yes in step s32), an indication sheet for the main tray as the paper output destination is fed (step s33). Next, "Remove N sheet" is printed on the indication sheet to indicate the number of sheets to be removed (step s34), and it is determined whether outputting of paper to the main tray has been completed (step s35). If outputting of paper to the main tray has not been completed (No in step s35), the completion of outputting of paper is waited. If outputting of paper to the main tray has been completed (Yes in step s35), it is determined whether M>0 (step s36).

If M>0 is not satisfied in step s36 (No in step s36), the process moves to step s40 and sets 0 for N and M (step s40). If M>0 is satisfied in step s36 (Yes in step s36), an indication sheet for the sub tray as the paper output destination is fed (step s37). Next, "Remove M sheets" is printed on the indication sheet to indicate the number of sheets to be removed (step s38), and it is determined whether outputting of paper to the sub tray has been completed (step s39). If outputting of paper to the sub tray has not been completed (No in step s39), the completion of outputting of paper is waited.

If outputting of paper to the sub tray has been completed (Yes in step s39), 0 is input for M and N (step s40), the correction values are fed back, and paper feeding is started from the sheet on which the misalignment was detected (step s41) to prepare for reprinting, and then the process is finished.

According to this embodiment, in the case when transfer media which were determined to be faulty based on image reading were output to a plurality of output destinations, the faulty transfer media output to a plurality of output destinations are easily removed, thereby producing the effect of preventing missing pages.

The present invention has been described based on the above embodiments, but the present invention is not limited to the contents of the above description, and appropriate modifications to the above embodiments can be made without departing from the scope of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus having an image forming section for forming an image on a sheet comprising:
a conveyer conveying the sheet; and
a hardware processor configured to:
acquire an image reading result for a sheet on which an image is formed,
determine whether the sheet is faulty, and,
when the sheet is determined to be faulty and there are a plurality of output destinations for faulty sheets which include a faulty sheet determined to be faulty and a following sheet having already been fed after the faulty sheet, give a warning about removal of the faulty sheets for each of the plurality of output destinations.

2. The image forming apparatus according to claim 1, wherein the hardware processor gives the warning after stopping a printing operation.

3. The image forming apparatus according to claim 1, wherein the hardware processor gives notification, as the warning, to remove the faulty sheets for each of the plurality of output destinations in which faulty sheets have been fed.

4. The image forming apparatus according to claim 3, comprising a display for performing display, wherein
the hardware processor gives the notification by displaying the notification in the display.

5. The image forming apparatus according to claim 3, wherein the hardware processor includes a number of faulty sheets to be removed in the notification.

6. The image forming apparatus according to claim 5, wherein, when a fed sheet becomes a jammed sheet, the hardware processor subtracts a number of the jammed sheets from the number of faulty sheets to be removed.

7. The image forming apparatus according to claim 1, wherein the hardware processor issues a control to insert an indication sheet for each of the plurality of output destinations in which faulty sheets have been fed as the warning when recovery starts.

8. The image forming apparatus according to claim 7, wherein the hardware processor issues a control to print on the indication sheet a message asking removal of the faulty sheets for each of the plurality of output destinations in which faulty sheets have been fed.

9. The image forming apparatus according to claim 8, wherein, when a fed transfer medium becomes a jammed sheet, the hardware processor subtracts a number of sheets of the jammed sheet from a number of sheets to be removed which is to be printed on the indication sheet.

10. The image forming apparatus according to claim 7, wherein after starting recovery, the hardware processor issues a notification of every indication sheet by voice at a timing after all jobs in which fault occurred has finished normally.

11. The image forming apparatus according to claim 1, comprising an image reader for reading an image on a sheet.

12. The image forming apparatus according to claim 1, comprising a plurality of output destinations to which sheets are output through the conveyor.

13. The image forming apparatus according to claim 1, wherein the hardware processor determines whether a fault has occurred while performing real-time adjustment.

14. An image forming system having an image forming section for forming an image on a sheet comprising:
a conveyer conveying the sheet; and
a hardware processor configured to;
acquire an image reading result for a sheet on which an image is formed
determine whether the sheet is faulty, and,
when the sheet is determined to be faulty and there are a plurality of output destinations for faulty sheets which include a faulty sheet determined to be faulty and a following sheet having already been fed after the faulty sheet, give a warning about removal of the faulty sheets for each of the plurality of output destinations.

15. The image forming system according to claim 14, comprising:
an image forming section for forming an image on a sheet; and
a plurality of output destinations to which transfer media are output through the conveyor.

16. The image forming system according to claim 14, further comprising an image reader for reading an image on a sheet.

17. A non-transitory computer-readable recording medium storing a program to be executed by a hardware processor configured to control an image forming apparatus, wherein
the program causes a computer to perform acquiring an image reading result for a sheet on which an image is formed and determining whether the sheet is faulty, and
when it is determined that the sheet is faulty and there are a plurality of output destinations for faulty sheet which are the sheet determined to be faulty and sheets having already been fed after the sheet determined to be faulty, giving a warning about removal of the faulty sheets for each of the plurality of output destinations in which faulty sheets have been fed.

18. The non-transitory computer-readable recording medium storing the program according to claim 17, wherein the warning is a notification asking removal of the faulty sheets for each output destination.

19. The non-transitory computer-readable recording medium storing the program according to claim 17, wherein the program causes the computer to perform control to insert an indication sheet for each of the plurality of output destinations in which faulty sheets have been fed as the warning when recovery starts.

20. The non-transitory computer-readable recording medium storing the program according to claim 17, wherein the warning includes a number of sheets of faulty sheets to be removed.

21. An image forming system having a plurality of output destinations for outputting a plurality of sheets comprising;
a conveyer conveying the plurality of sheets having images thereon;
an image reading device configured to read the images formed on the sheets; and
a hardware processor configured to:
determine whether any of the sheets having images thereon is faulty based on an image reading result of the image reading device, and
issue a notification that identifies output destinations to which a faulty sheet and one or more additional sheets after the faulty sheet are conveyed.

22. The image forming apparatus according to claim 21, wherein the hardware processor gives the notification after stopping a printing operation.

23. The image forming apparatus according to claim 21, wherein the hardware processor gives the notification to remove the faulty sheets for the plurality of output destinations in which faulty sheets have been fed.

24. The image forming apparatus according to claim 23, comprising a display for performing display, wherein
the hardware processor gives the notification by displaying the notification in the display.

25. The image forming apparatus according to claim 23, wherein the hardware processor includes a number of faulty sheets to be removed in the notification.

26. The image forming apparatus according to claim 25, wherein, when a fed sheet becomes a jammed sheet, the hardware processor subtracts a number of the jammed sheets from the number of faulty sheets to be removed.

27. The image forming apparatus according to claim 21, wherein the hardware processor issues a control to insert an indication sheet for each of the plurality of output destinations in which faulty sheets have been fed.

28. The image forming apparatus according to claim 27, wherein the hardware processor issues a control to print on the indication sheet a message asking removal of the faulty sheets for the plurality of output destinations in which faulty sheets have been fed.

29. The image forming apparatus according to claim 28, wherein, when a fed transfer medium becomes a jammed sheet, the hardware processor subtracts a number of sheets of the jammed sheet from a number of sheets to be removed which is to be printed on the indication sheet.

30. The image forming apparatus according to claim 27, wherein after starting recovery, the hardware processor performs control to notify output destinations of every indication sheet by voice at a timing after all jobs in which fault occurred has finished normally.

31. The image forming apparatus according to claim 21, comprising an image reading section for reading an image on a sheet.

32. The image forming apparatus according to claim 21, wherein the hardware processor determines whether a fault has occurred while performing real-time adjustment.

33. The image forming apparatus according to claim 21, wherein the notified output destinations are more than one output destination among the plurality of output destinations.

34. An image forming system having a first plurality of output destinations for outputting a plurality of sheets comprising;
   a conveyer conveying the plurality of sheets having images thereon, the conveyer being configured to convey the plurality of sheets to the first plurality of output destinations;
   an image reading device configured to read the images formed on the sheets; and
   a hardware processor configured to:
   determine whether any of the sheets having images thereon is faulty based on an image reading result of the image reading device,
   convey a first faulty sheet and a second sheet conveyed after the first faulty sheet to a second plurality of output destinations among the first plurality of output destinations, and
   issue a notification to the second plurality of output destinations.

35. The image forming apparatus according to claim 34, wherein the hardware processor gives the notification after stopping a printing operation.

36. The image forming apparatus according to claim 34, wherein the hardware processor gives the notification to remove the faulty sheets for the second plurality of output destinations in which faulty sheets have been fed.

37. The image forming apparatus according to claim 36, comprising a display for performing display, wherein
   the hardware processor gives the notification by displaying the notification in the display.

38. The image forming apparatus according to claim 36, wherein the hardware processor includes a number of faulty sheets to be removed in the notification.

39. The image forming apparatus according to claim 38, wherein, when a fed sheet becomes a jammed sheet, the hardware processor subtracts a number of the jammed sheets from the number of faulty sheets to be removed.

40. The image forming apparatus according to claim 34, wherein the hardware processor issues a control to insert an indication sheet for the second plurality of output destinations in which faulty sheets have been fed when recovery starts.

41. The image forming apparatus according to claim 40, wherein the hardware processor issues a control to print on the indication sheet a message asking removal of the faulty sheets for the second plurality of output destinations in which faulty sheets have been fed.

42. The image forming apparatus according to claim 41, wherein, when a fed transfer medium becomes a jammed sheet, the hardware processor subtracts a number of the jammed sheets from a number of sheets to be removed which is to be printed on the indication sheet.

43. The image forming apparatus according to claim 40, wherein after starting recovery, the hardware processor performs control to notify output destinations of every indication sheet by voice at a timing after all jobs in which fault occurred has finished normally.

44. The image forming apparatus according to claim 34, comprising an image reading section for reading an image on a sheet.

45. The image forming apparatus according to claim 34, wherein the hardware processor determines whether a fault has occurred while performing real-time adjustment.

* * * * *